(12) United States Patent
Flinta et al.

(10) Patent No.: US 11,641,132 B2
(45) Date of Patent: May 2, 2023

(54) METHODS AND APPARATUS FOR CONTROLLING THE POWER SUPPLY OF A NETWORK NODE

(71) Applicant: Telefonaktiebolaget LM Ericsson (publ), Stockholm (SE)

(72) Inventors: Christofer Flinta, Stockholm (SE); Lackis Eleftheriadis, Gävle (SE); Amos Kao, Overland Park, KS (US); Konstantinos Vandikas, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 17/257,110

(22) PCT Filed: Jul. 3, 2018

(86) PCT No.: PCT/EP2018/067862
§ 371 (c)(1),
(2) Date: Dec. 30, 2020

(87) PCT Pub. No.: WO2020/007445
PCT Pub. Date: Jan. 9, 2020

(65) Prior Publication Data
US 2021/0159727 A1 May 27, 2021

(51) Int. Cl.
*H02J 13/00* (2006.01)
*H02J 7/00* (2006.01)
(Continued)

(52) U.S. Cl.
CPC ........ *H02J 13/00006* (2020.01); *G05B 15/02* (2013.01); *H02J 7/0048* (2020.01); *H04L 12/10* (2013.01)

(58) Field of Classification Search
CPC ...... H02J 13/00006; H02J 7/0048; H02J 9/06; H02J 7/0047; G05B 15/02; H04L 12/10;
(Continued)

(56) References Cited

U.S. PATENT DOCUMENTS 9,232,045 B1 1/2016 Price et al.
10,389,126 B2 * 8/2019 Kearns ...................... H02J 3/24
(Continued)

FOREIGN PATENT DOCUMENTS

DE 102012203437 A1 9/2013

OTHER PUBLICATIONS

International Search Report and Written Opinion dated Dec. 4, 2018 for International Application No. PCT/EP2018/067862 filed on Jul. 3, 2018, consisting of 15-pages.

*Primary Examiner* — Ramesh B Patel
(74) *Attorney, Agent, or Firm* — Christopher & Weisberg, P.A.

(57) ABSTRACT

Embodiments described herein provided methods and apparatus for controlling switching a power supply of a first network node between an electrical power grid and an alternative power supply in which the first network node is configured to transmit data to a second network node over a data transmission link. The method includes receiving first information indicative of a predicted decrease in a transmission rate of data transmitted by the first network node over the data transmission link. Responsive to receiving the first information, a first request is transmitted to the first network node to switch the power supply of the first network node from the electrical power grid to the alternative power supply.

20 Claims, 11 Drawing Sheets

(51) Int. Cl.
*G05B 15/02* (2006.01)
*H04L 12/10* (2006.01)

(58) Field of Classification Search
CPC ... H04L 12/40136; Y02B 70/30; Y02B 90/20; Y02D 30/50; Y04S 20/12; Y04S 20/20
See application file for complete search history.

(56) References Cited

U.S. PATENT DOCUMENTS

| | | | |
|---|---|---|---|
| 10,756,543 B2 * | 8/2020 | Detmers | H02J 3/32 |
| 11,288,755 B2 * | 3/2022 | Forbes, Jr. | G06Q 30/0206 |
| 2011/0121654 A1 * | 5/2011 | Recker | H05B 45/3725 |
| | | | 307/64 |
| 2011/0282508 A1 * | 11/2011 | Goutard | H02J 3/06 |
| | | | 700/286 |
| 2014/0354234 A1 * | 12/2014 | Sudan | H02J 7/0063 |
| | | | 307/18 |
| 2014/0379156 A1 * | 12/2014 | Kamel | G01R 21/133 |
| | | | 700/291 |
| 2014/0379160 A1 | 12/2014 | Fallon | |
| 2019/0360739 A1 * | 11/2019 | Brown | E01D 19/16 |
| 2020/0151371 A1 * | 5/2020 | Freunek | G06F 30/18 |
| 2021/0159727 A1 * | 5/2021 | Flinta | H02J 7/0048 |
| 2022/0121260 A1 * | 4/2022 | King | H02J 3/007 |

* cited by examiner

METHODS AND APPARATUS FOR CONTROLLING THE POWER SUPPLY OF A NETWORK NODE

CROSS-REFERENCE TO RELATED APPLICATIONS

This application is a Submission Under 35 U.S.C. § 371 for U.S. National Stage Patent Application of International Application Number: PCT/EP2018/067862, filed Jul. 3, 2018 entitled "METHODS AND APPARATUS FOR CONTROLLING THE POWER SUPPLY OF A NETWORK NODE," the entirety of which is incorporated herein by reference.

TECHNICAL FIELD

Embodiments described herein relate to methods and apparatus for controlling switching of a power supply of a network node in a communication network, for example a telecommunications network or a data transmission network.

BACKGROUND

In a communications network (for example, a telecommunications network), a pair of network nodes comprised within said communication network may be communicatively interconnected via a data transmission link or an electrical connection. In some examples, the data transmission link may provide an optical link between said pair of network nodes. This optical link may allow optical signals to be transmitted from, and received by, each of the pair of interconnected network nodes respectively. Thus, the interconnected network nodes can communicate via the data transmission link, and data may be transmitted between the interconnected network nodes along the data transmission link.

The transmission rate in a data transmission link may increase as the strength of the optical signals being transmitted along the data transmission link increases. In some examples, the transmission rate may increase with the strength of the optical signals being transmitted until a maximum transmission rate is reached when the strength of the optical signals reaches a threshold level. Thus, in order to maximise the transmission rate through a data transmission link, it may be desirable to maintain the optical signal strength at or above the threshold level in order to maintain the maximum transmission rate.

FIG. 1 illustrates an example of a communications network 100. The communications network 100 comprises a first network node 101 and a second network node 102. The first network node 101 and the second network node are both configured to be powered by an electrical power grid, which is configured to provide power to the first network node 101 and the second network node 102, respectively.

The first network node 101 and the second network node 102 are communicatively interconnected via a data transmission link 103. In this example, the data transmission link 103 provides an optical link between the first network node 101 and the second network node 102.

The communications network 100 further comprises a Network Operation Centre, NOC, 104. The NOC 104 is configured to communicate with the first network node 101 and the second network node 102 respectively. A NOC may monitor and remotely control a network node, and the power supply of the network node it is configured to communicate with.

A NOC may be configured to communicate with a plurality of network nodes.

The first network node 101 and the second network node 102 may be eNodeBs. If both the first network node 101 and the second network node 102 are eNodeBs, then the first network node 101 and the second network node 102 may communicate using, for example, an X2 interface.

If network nodes within a communications network (for example, communications network 100 illustrated in FIG. 1) are connected to and powered by an electrical power grid, then during certain times periods, the power supplied from the electrical power grid may fluctuate.

Resultantly, the optical signal strength across a data transmission link connecting the network nodes supplied by said electrical power grid, may fluctuate during these time periods. If the optical signal strength drops below the threshold level of optical signal strength during these fluctuations, then the transmission rate across the data transmission link may decrease.

These fluctuations in the power supplied by an electrical power grid may be as a result of the electrical power grid being under dimensioned, which implies that the power supply will be unstable during, for example, peak hours. In another example, the cables interconnecting the network nodes and the electrical power grid may be old or damaged from sun and weather. This may result in physical cracks in the cables developing over time that may short circuit the electrical currents, for example during rain, which may lead to fluctuations in the power supplied.

If the fluctuations of the optical signal strength in a data transmission link are too large, for example, if the fluctuations cause the optical signal strength to drop below the threshold level of optical signal strength, then the transmission rate across the data transmission link may be degraded during this period of fluctuations. This decrease in the transmission rate may harm the performance of downstream network nodes, and ultimately harm the quality of experience for end users.

FIG. 2 illustrates a communications network 200, comprising a first network node 201, a second network node 202, a third network node 203 and a fourth network node 204. In this example, the fourth network node 204 acts as a "hub" network node. The fourth network node 204 is configured to communicate with the first network node 201 via a first data transmission link 205, the second network node 202 via a second data transmission link 206, and the third network node 203 via a third data transmission link 207. In this example, the first, second and third data transmission links 205, 206 and 207 provide optical links between the fourth network node 204 and the first network node 201, between the fourth network node 204 and the second network node 202, and between the fourth network node 204 and the third network node 203, respectively.

Each of the first network node 201, the second network node 202, the third network node 203 and the fourth network node 204 are configured to connect to an electrical power grid (not illustrated).

The first network node 201, the second network node 202, the third network node 203 and the fourth network node 204 may be eNodeBs. If both of the network nodes connected by one of the above described data transmission links are eNodeBs, then said pair of connected eNodeBs may communicate using the X2 interface along said data transmission link.

In this example, the fourth network node 204 is configured to connect to a Network Operation Centre, NOC, 208 via a fifth data transmission link 209. In this example, the fifth data transmission link 209 provides an optical link between the fourth network node 204 and the NOC 208. In this example, the NOC 208 is configured to provide control for both the fourth network node 204 (the "hub" site), and is further configured to control each of the first network node 201, the second network node 202, and the third network node 203 (the "base-station" sites).

At some Network Operation Centers, NOCs, it is possible to manually switch the power supply of a network node from the electrical power grid onto some alternative power supply in order to isolate the network node from fluctuations in the power supplied from the electrical power grid.

However, as this is a manual and reactive process, it may take considerable time to detect (or may not be possible to detect) that the power supply to a network node is fluctuating. As a result of this, the isolation of the network node from the fluctuating power supply may occur after some delay (or may not even occur), resulting in a degraded transmission rate across the data transmission link, and harming the quality of experience for end users.

SUMMARY

According to some embodiments there is provided a method for controlling switching a power supply of a first network node between an electrical power grid and an alternative power supply, said first network node configured to transmit data to a second network node over a data transmission link. The method comprises receiving first information indicative of a predicted decrease in a transmission rate of data transmitted by the first network node over the data transmission link; and responsive to receiving the first information, transmitting a first request to the first network node to switch the power supply of the first network node from the electrical power grid to the alternative power supply.

According to some embodiments there is provided a method, in a first network node for controlling switching a power supply of the first network node between an electrical power grid and an alternative power supply, said first network node configured to transmit data to a second network node over a data transmission link. The method comprises transmitting an indication of a charge level of the alternative power supply to a power controlling network node; and receiving, from the power controlling network node, a request to switch the power supply of the first network node from the electrical power grid to the alternative power supply.

According to some embodiments there is provided a power controlling network node for controlling switching a power supply of a first network node between an electrical power grid and an alternative power supply, said first network node configured to transmit data to a second network node over a data transmission link. The power controlling network node comprises an interface; and a processor, wherein the processor is operable to receive first information indicative of a predicted decrease in a transmission rate of data transmitted by the first network node over the data transmission link; and responsive to receiving the first information, transmit a first request to the first network node to switch the power supply of the first network node from the electrical power grid to the alternative power supply.

According to some embodiments there is provided a first network node for controlling switching a power supply of the first network node between an electrical power grid and an alternative power supply, said first network node configured to transmit data to a second network node over a data transmission link. The first network node comprises an interface; and a processor, wherein the processor is operable to transmit an indication of a charge level of the alternative power supply to a power controlling network node; and receive, from the power controlling network node, a request to switch the power supply of the first network node from the electrical power grid to the alternative power supply.

BRIEF DESCRIPTION OF THE DRAWINGS

For a better understanding of the present invention, and to show how it may be put into effect, reference will now be made, by way of example only, to the accompanying drawings, in which.

DESCRIPTION

Figure 1:
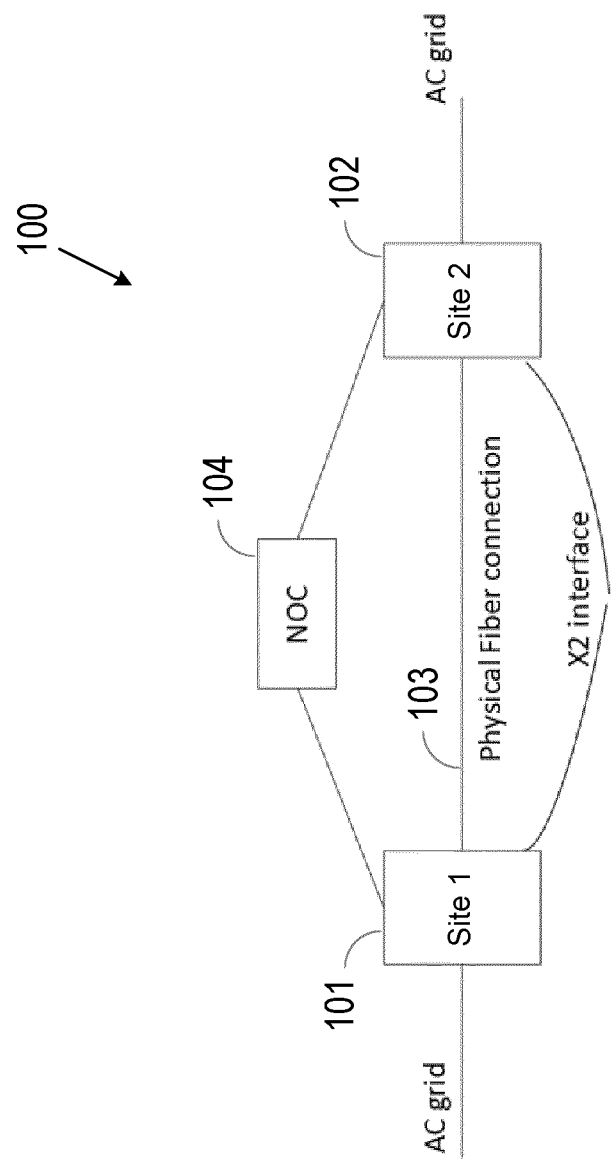
FIG. 1 illustrates an example of a communications network.
Figure 2:
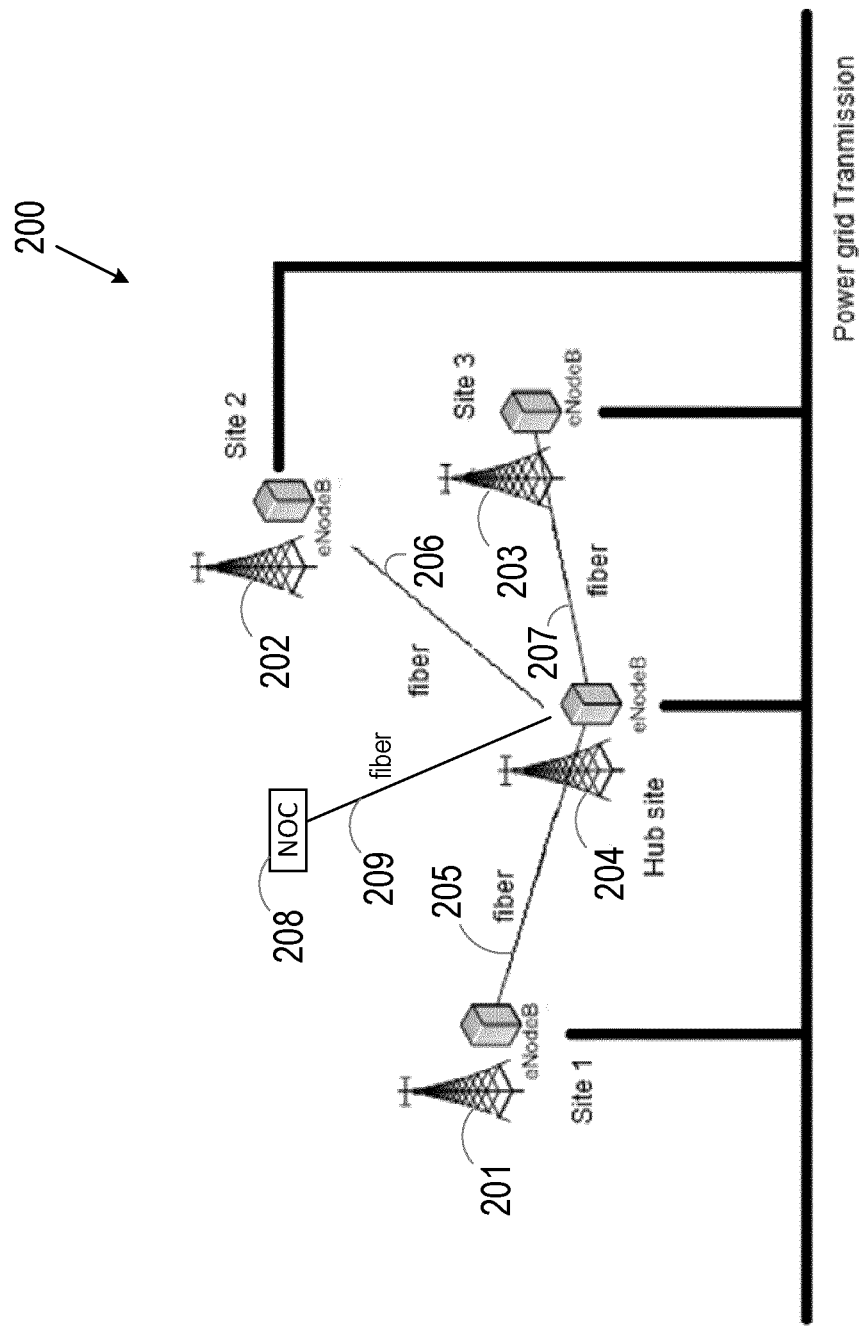
FIG. 2 illustrates an example of a communications network.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The description involves communication between network nodes, which may comprise multiple optical network nodes. However the network nodes may comprise radio access nodes for example eNodeBs (eNBs), as defined by 3GPP, or gNodeBs (gNBs) as utilised in the future standards expected to meet the 5G requirements. However, it will be appreciated that the concepts described herein may involve any network nodes.

Moreover, where the following description refers to steps taken in or by a network node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Embodiments described herein provide methods and apparatus for switching the power supply of a network node transmitting information over a data transmission link to another network node. In particular, embodiments described herein mitigate the problems described above associated with unstable transmission rates caused by problems with the power supply to transmitting network nodes.

Figure 3:
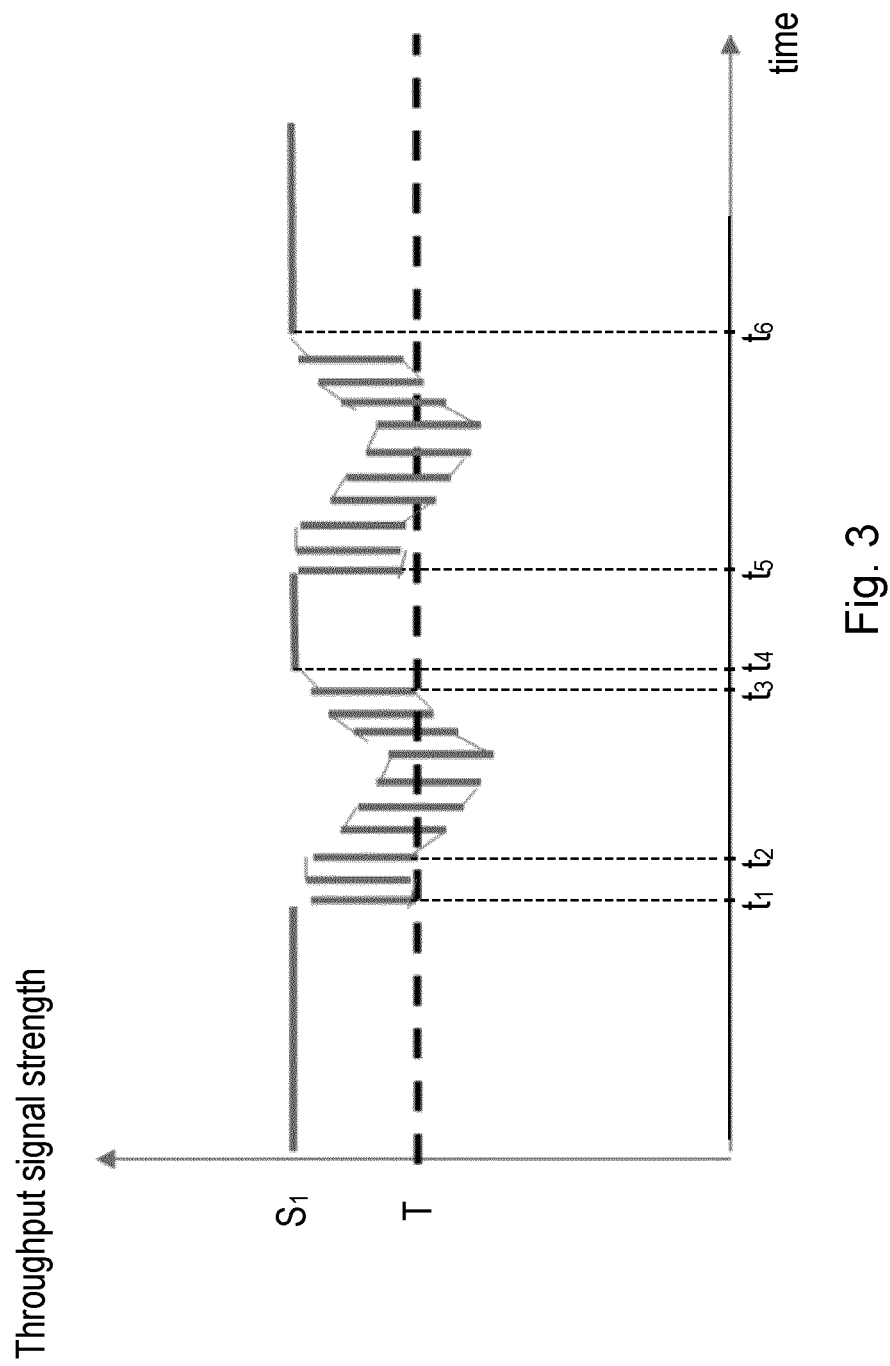
FIG. 3 illustrates an example of the fluctuations in the signal strength of signals received over a data transmission link with time.

FIG. 3 shows an example of the fluctuations in the signal strength of signals received over a data transmission link (for example, data transmission link 103 as shown in FIG. 1) with time.

The threshold level, T, below for which the transmission rate through the data transmission link will drop below the maximum transmission rate is indicated by the dotted line.

In this example, between times $t_o$, and $t_1$, the signal strength in the data transmission link remains at a constant value, $S_1$, where that constant value exceeds the threshold level, T, of signal strength. During this period, the signal strength in the data transmission link remains constant at a value above the threshold level T, thereby helping to ensure that the transmission rate remains at the maximum transmission rate.

At time $t_1$, the signal strength in the data transmission link begins to fluctuate. These fluctuations in the signal strength may result from fluctuations in the power supplied from the electrical power grid to the network nodes that are interconnected by the data transmission link. At time $t_2$, the signal strength drops below the threshold level, T, of signal strength. This drop in the signal strength, at time $t_2$, may be an indication that the transmission rate across the data transmission link will decrease. This indication that a decrease in transmission rate may occur, may result in an alarm being generated at the network node that is receiving data over the data transmission link (for example, the second network node 102). It will be appreciated that both of the pair of network nodes that are communicating over the data transmission link (for example, the first network node 101 and the second network node 102) may both be configured to transmit and receive data via the data transmission link. In other words, it will be appreciated that the data transmission link may be bi-directional.

Between times $t_2$ and $t_3$, the signal strength in the data transmission link continues to fluctuate between values that lie above and below the threshold level, T, of signal strength. As mentioned above, during the periods of time in which the signal strength is below the threshold level, T, of signal strength, the transmission rate across the data transmission link may decrease.

Hence, for a the time between $t_2$ and $t_3$ where the signal strength fluctuates above and below the threshold level, T, of signal strength, the transmission rate across the data transmission link may also fluctuate between a maximum rate and a decreased rate. As a result, a burst of alarms may be generated at the network node that is receiving data over the data transmission link. For example an alarm may be generated each time the signal strength drops below the threshold level, T.

At time $t_4$, the fluctuations in the signal strength end. For a period of time between times $t_4$ and $t_5$, the signal strength in the data transmission link once more remains at a constant value, $S_1$, where the value of $S_1$ exceeds the threshold level, T. During this period between $t_4$ and $t_5$, the signal strength in the data transmission link remains constant at a value above the threshold level T, thereby helping to ensure that the transmission rate remains at the maximum transmission rate.

At time $t_5$, a second period of signal strength fluctuations begins, ending at time $t_6$. Similarly to as described for the time period between $t_1$ and $t_4$, where the signal strength in the data transmission line drops between the threshold level, T, these fluctuations above and below the threshold level, T, may be indicative of a drop in the transmission rate.

Figure 4:
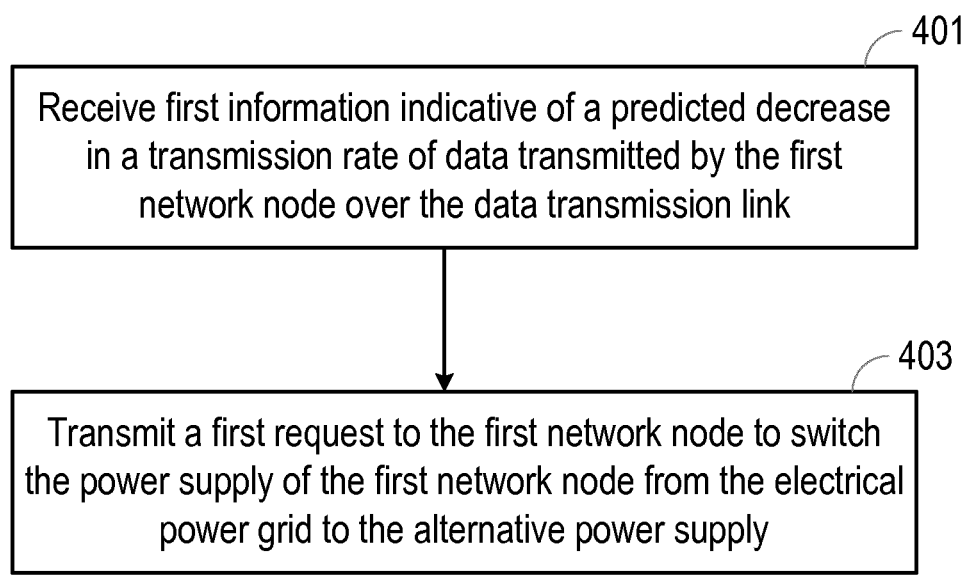
FIG. 4 illustrates a method for controlling switching a power supply of a first network node between an electrical power grid and an alternative power supply according to some embodiments of the disclosure.

FIG. 4 illustrates a method for controlling switching a power supply of a first network node between an electrical power grid and an alternative power supply according to some embodiments of the disclosure. The method illustrated in FIG. 4 may be carried out in a network node configured to receive data transmitted over a data transmission link, such as the second network node 102, for example. Alternatively, the method may be carried out in a network node configured to communicate with a second network node, wherein the second network node is configured to receive data transmitted over a data transmission link, such as NOC 104, for example. Alternatively, the method illustrated in FIG. 4 may be carried out by any suitable network node, or combination of network nodes, comprised within a communication network, such as the communications network 100.

Although it will be appreciated that the method of FIG. 4 may be performed by the second network node 102, the NOC 104, or any suitable network node or combination of network nodes comprised within a suitable communications network (for example, communications network 100), the method of FIG. 4 will be described below with reference as to being performed by a network node.

In step 401 of FIG. 4, the network node receives first information indicative of a predicted decrease in a transmission rate of data transmitted by a first network node for example, first network node 101, over a data transmission link, for example, data transmission link 103.

In some embodiments, the network node may predict future signal strength fluctuations based on the received first information. In some embodiments, responsive to the prediction of the future signal strength fluctuations meeting a predetermined criterion, the network node may determine that the received first information is indicative of a predicted decrease in a transmission rate of the data transmitted by the first network node over the data transmission link.

In some embodiments, the received first information may comprise one or more of: an indication of the signal strength received at the second network node (such as second network node 102, for example), an indication of a weather condition at a location of the first network node, an indication of a weather forecast at a location of the first network node, and an indication of an unstable supply of power from the electrical power grid.

In some embodiments, the indication of an unstable supply of power from the electrical power grid may comprise a calendar statistic. For example, the calendar statistic may comprise a timestamp from which the hour, weekday, month or other calendar related information may be extracted. The calendar statistic may be indicative of peak hours for the electrical power grid, or other times in which the electrical power grid is experiencing a high load, and thus may be indicative of a potentially unstable supply of power from the electrical power grid.

In step 403, responsive to receiving the first information, the network node transmits a first request to the first network node to switch the power supply of the first network node from the electrical power grid to the alternative power supply.

Figure 5:
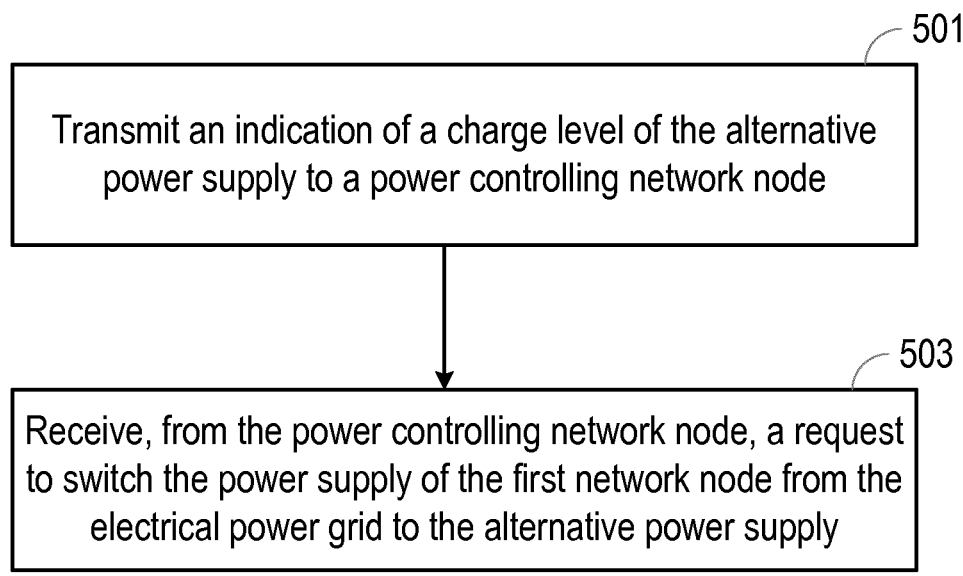
FIG. 5 illustrates a method for controlling switching a power supply of the first network node between an electrical power grid and an alternative power supply according to further embodiments of the disclosure.

FIG. 5 illustrates a method for controlling switching a power supply of the first network node between an electrical power grid and an alternative power supply according to further embodiments of the disclosure. The method may be carried out in a first network node, for example the first network node 101, configured to transmit data over a data transmission link to a second network node.

In step 501, the first network node transmits an indication of a charge level of the alternative power supply to a power controlling network node, for example the second network node 102 or the NOC 104.

In step 503, the first network node receives, from the power controlling network node, a request to switch the power supply of the first network node from the electrical power grid to the alternative power supply.

In some examples, the first network node, responsive receiving the request, determines that a charge level of the alternative power supply exceeds a first threshold level and responsive to determining that the charge level of the alternative power supply exceeds the threshold level, switches the power supply of the first network node from the electrical power grid to the alternative power supply. In other words, in some embodiments, the first network node may only switch the power supply to the alternative power supply if the charge level of the alternative power supply is high enough.

Figure 6:
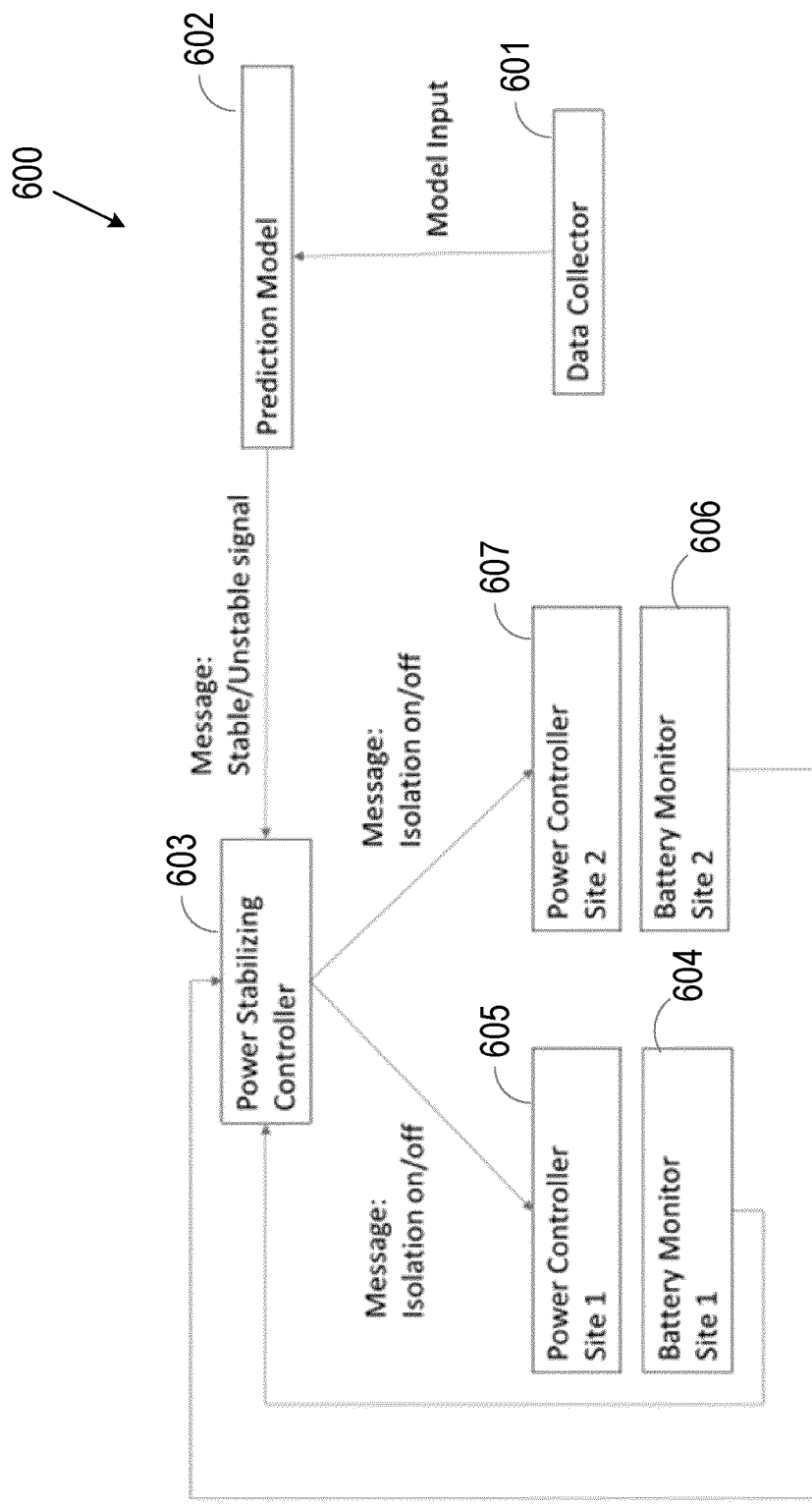
FIG. 6 is a block diagram schematically depicting an example of a communications network 600 according to embodiments of the disclosure.

FIG. 6 is a block diagram schematically depicting an example of a communications network 600 according to embodiments of the disclosure. For example, the communications network 600 may comprise the first network node 101, the second network node 102, and the NOC 104 described above.

In this example, the communications network 600 comprises a Data Collector 601, a Prediction Model 602, and a Power Stabilizing Controller, PSC, 603. The Data Collector 601, the Prediction Model 602, and the PSC 603 may be comprised within a Network Operation Control node, such as NOC 104. Alternatively, the Data Collector 601, the Prediction Model 602, and the PSC 603 may be comprised within any suitable network node, such as second network node 102.

The method as described with respect to FIG. 4 may therefore be performed in some embodiments by the second network node 102, and in some embodiments by the NOC 104. In some embodiments the functionality required to perform the method of FIG. 4 may be split across many nodes in the network, for example split across the NOC 104 and the second network node 102.

The communications network 600 further comprises a first Battery Monitor 604 and a first Power Controller 605. The first Battery Monitor 604 and the first Power Controller 605 may be comprised within the first network node 101.

In some embodiments, the step 401 of the method of FIG. 4 may comprise the Data Collector 601 receiving the first information indicative of a predicted decrease in a transmission rate of data transmitted by the first network node 101 over the data transmission link 103. The Data Collector 601 may receive the first information from the second network node 102. In some embodiments, the received first information may comprise an indication of the signal strength of data transmissions received at the second network node over the data transmission link 103. For example the indication of the signal strength may comprise an alarm generated at the second network node 102 when the received signal strength drops below a predetermined threshold (for example as illustrated in FIG. 3).

In some embodiments, the Data Collector 601 receives the first information from one or more external source. For example, the received first information may comprise an indication of a weather condition at a location of the first network node 101. In some embodiments, the indication of the weather condition at the location of the first network node 101 may be received from a weather sensor located at the first network node 101 or the second network node 102 (where the second network node 102 is located sufficiently close to the first network node 101 for the weather conditions at the second network node 102 to be expected to be similar to the weather conditions at the first network node 101). Additionally or alternatively, the received first information may comprise an indication of a weather forecast at a location of the first network node 101. In some embodiments, the indication of the weather forecast at the location of the first network node 101 may be received from an external weather forecasting service. Additionally or alternatively, the received first information may comprise an indication of some other environmental condition at a location of the first network node 101.

Additionally or alternatively, the received first information may comprise an indication of an unstable supply of power from the electrical power grid. In some embodiments, the indication of a potentially unstable supply of power from the electrical power grid may comprise a calendar-related statistic. For example, the calendar-related statistic may comprise a timestamp.

It will be appreciated that the received first information may comprise any suitable performance metric that is indicative of a predicted decrease in the data transmission rate of data transmitted by the first network node 101 over the data transmission link 103.

In some embodiments, the Data Collector 601 may further process the received first information. For example, the Data Collector 601 may aggregate, truncate, or further select the received first information. Alternatively, the Data Collector 601 may receive pre-processed first information.

The Data Collector 601 may then transmit the received first information to the Prediction Model 602.

In some embodiments, the Prediction Model 602 may be configured to determine that the received first information is indicative of a predicted decrease in a transmission rate of data transmitted by the first network node 101 over the data transmission link 103 by comparing the received first information with a model. In some embodiments, the model may comprise a machine learning model which has been trained using historical data. In some examples, the machine learning model may updated using the received first information and information relating to the performance of the model in predicting a decrease in transmission rate.

The historical data may, for example, comprise historical data relating to the signal strength received at the second network node 102, historical data relating to an indication of a weather condition at a location of the first network node 101, historical data relating to an indication of a weather forecast at a location of the first network node 101 and/or historical data relating to an indication of a potentially unstable supply of power from the electrical power grid. In some embodiments, the indication of an unstable supply of power from the electrical power grid may comprise a calendar-related statistic, for example, a timestamp.

In some embodiments, the Prediction Model 602 may predict future signal strength fluctuations based on the received first information. In some embodiments, responsive to the prediction of the future signal strength fluctuations meeting a predetermined criterion, the Prediction Model 602 may determine that the received first information is indicative of a predicted decrease in a transmission rate of the data transmitted by the first network node 101 over the data transmission link 103. For example, the predetermined criterion may be that the signal strength across the data transmission link 103 drops below a threshold level, below which it is expected that the transmission rate through the data transmission link 103 will drop below the maximum transmission rate.

In some embodiments, the received information may comprise a number of alarms generated at the second network node 102. An alarm may be generated by the second network node 102 when the signal strength across the data transmission link 103 drops below the threshold level below which the transmission rate through the data transmission link 103 is expected to drop below the maximum transmission rate.

Thus, in a time period in which the signal strength across the data transmission link 103 fluctuates, there may be a series of several alarms generated in quick succession at the second network node 102 as the signal strength fluctuates during the time period. When this occurs, it is likely that the transmission rate in the data transmission link 103, will have degraded at some point in said period. Alarms may be considered as being generated in quick succession if the time between the alarms is below a predetermined time, for example 1 to 10 ms. In some embodiments, the predetermined time may be determined from historical data.

For example, a first number of consecutively generated alarms may be used to predict the length of a time period during which a total "burst" of alarms generated in quick succession occurs. The length of the time period that is predicted will correspond to the length of the period in which the transmission rate is also likely to be degraded. In some embodiments, the prediction of the total length of the period may be generated using a model. The model may have been trained from historical data of similar events. For example, the model may have been trained using data from historical periods in which "bursts" of alarms were generated in quick succession at the second network node 102. For example, the model may associate the length of a "burst" of alarms with a characteristic of a first number of alarms in the "burst". For example, the characteristic may comprise a duration of the first alarm in the "burst" or a time period between the first two alarms of a "burst". In this way, a first number (for example 1 or 2) of the alarms in a "burst" may be used to predict the total length of the "burst". In another example, the characteristic may comprise a plurality of timestamps being generated in quick succession, wherein each timestamp is generated as a result of an alarm being generated.

In some embodiments, the model may use an average "burst" period of historical "burst" periods associated with the characteristic of the first number of alarms as the predicted length of the time period in which the transmission rate is likely to be degraded. The model however, may comprise any other suitable model that can be used to generate a prediction of the length of the period of the "burst" of alarms generated in quick succession.

In some embodiments, the received first information may comprise a measurement of the signal strength received over the data transmission link 103. In this case, the predicted decrease in a transmission rate may occur prior to the generation of an alarm at the second network node 102 (and thus, is likely to occur prior to a degradation in the transmission rate). For example, the model may in this example compare the measured signal strength to a second threshold $T_2$ which is higher than T. In this example, therefore the model may predict that signal strength is due to drop below the threshold T if it remains below the threshold $T_2$ for a predetermined period of time.

In some embodiments, the future signal strength fluctuations based on the received first information (wherein the received first information comprises a measurement of the signal strength across the data transmission link 103) may be predicted using an anomaly detection method. In some embodiments, the future signal strength fluctuations based on the received first information may be predicted using a trend in the measurement of signal strength. For example, if the measurement of the signal strength decreases during some predefined time period, reaches some predefined threshold, and/or decreases at some predefined rate, this may be indicative of future signal strength fluctuations.

In some embodiments, the prediction of the future signal strength fluctuations may be based on received weather data that is known to make the power supply from the electrical power grid unstable (such as heavy rain, for example), received weather forecast information that is known to make the power supply from the electrical power grid unstable (such as heavy rain, for example) and/or received data from the electrical power grid. For example, the prediction of the future signal strength fluctuations may be based on historical data received at times when the power supply from the electrical power grid was unstable.

In some embodiments, the prediction of the future signal strength fluctuations may be based on received calendar-related statistics. The calendar-related statistics may be indicative of previous decreases in a transmission rate of data, previous decreases in signal strength and/or previous signal strength fluctuations. For example, historical calendar-related statistics may indicate that during a certain time period each day (for example, peak hours of the use of the electrical power grid), or on certain days within the week (for example, Fridays), the power supplied by the electrical power grid may have a high probability of being unstable.

It will be appreciated that the prediction of the future signal strength fluctuations may be based on a combination of the above examples. For example, the Prediction Model 602 may be configured to primarily take into account received alarms or measured signal strength to determine whether or not the first network node should be switched to the alternative power supply. However, if the received weather forecast information indicates that heavy rain is due to occur at the first network node, the Prediction Model 602 may be configured to prioritise this information over any lack of received alarms or measured signal strength above the threshold T, and may choose to switch the first network node to the alternative power supply.

In some embodiments, the Prediction Model 602 may be configured to primarily take into account received calendar-related statistics, and use this received information to predict calendar-related variations in transmission rates of data. For example, if the Prediction Model 602 receives an indication that the electrical power grid has consistently supplied unstable power on Fridays, the Prediction Model 602 may predict signal strength fluctuations the following Friday.

Thus, in some embodiments, the Prediction Model 602 may use the received first information to predict whether the signal strength in the data transmission link 103 may be unstable or stable for a first future time period. In other words, a stable signal strength remains above the threshold T for the first future time period, whereas an unstable signal strength drops below the threshold T for the first future time period.

For example, the Prediction Model 602 may determine that the signal strength in the data transmission link 103 may be unstable for the first future time period if the received first information is indicative of a predicted decrease in a transmission rate of data transmitted by the first network node over the data transmission link during said first future time period. Similarly, the Prediction Model 602 may determine that the signal strength in the data transmission link 103 may be stable for the first future time period if the received first information is not indicative of a predicted decrease in a transmission rate of data transmitted by the first network node over the data transmission link during the first future time period. Alternatively or additionally, the Prediction Model 602 may determine that the signal strength in the data transmission link 103 may be stable for the first future time period if the received first information is indicative of a predicted increase in a transmission rate of data transmitted by the first network node over the data transmission link during the first future time period.

The Prediction Model 602 may generate an unstable signal message, in response to predicting that the signal strength in the data transmission link 103 may be unstable for the first future time period, or the Prediction Model 602 may generate a stable signal message in response to predicting the signal strength in the data transmission link 103 may be stable for the first future time period. In some embodiments, the prediction that the signal strength in the data transmission link 103 may be unstable for the first future time period may indicate that the power supply from the electrical power grid to the first network node 101 is predicted to be unstable for said first future time period. The Prediction Model 602 may then transmit this generated message to the PSC 603.

In some embodiments, the Prediction Model 602 may be configured to generate an indication of a first predicted period during which the signal strength is predicted to be unstable. In some embodiments, the indication of the first predicted period may be generated based on the received first information. Additionally or alternatively, the first predicted period may be generated based on historical data. The indication of the first predicted period may correspond to the period during which the predicted decrease in the transmission rate of data transmitted by the first network node 101 over the data transmission link 103 is predicted to occur. The Prediction Model 602 may transmit the indication of the first predicted period to the PSC 603. The predicted decrease in the transmission rate of data transmitted by the first network node 101 over the data transmission link 103 may or may not be associated with the first predicted period in the unstable signal message.

In some embodiments, the Prediction Model 602 may be configured to generate a first confidence value related to the predicted decrease in the transmission rate of data transmitted by the first network node 101 over the data transmission link 103. For example, the first confidence value may indicate a confidence in the predicted decrease in the transmission rate of data transmitted by the first network node 101 over the data transmission link 103 during said first predicted period. For example, the first confidence value may comprise a percentage likelihood that the transmission rate will drop from the maximum transmission rate during the first predicted period.

In some embodiments, the Prediction Model 602 may be trained using historical data. During this training process, the Prediction Model 602 may be configured to generate evaluations of the predictions it generates. These evaluations may be indicative of the accuracy of the predictions generated by the Prediction Model 602.

In some embodiments, in which the predicted decrease in the transmission rate is not associated with a first predicted period, the first confidence value may indicate a confidence in the predicted decrease in the data transmission rate of data transmitted by the first network node 101 over the data transmission link 103 until the first network node is otherwise notified that the transmission rate is stable by the Prediction Model 602.

In some embodiments, the Prediction Model 602 may transmit the first confidence value to the PSC 603.

In some embodiments, the PSC 603 may receive an unstable signal message from the Prediction Model 602. In response to receiving the unstable signal message, the PSC 603 may generate an isolation message. The isolation message may comprise a first request to the first network node 101 to switch the power supply of the first network node 101 from the electrical power grid to the alternative power supply. The PSC 603 may transmit the isolation message to the first network node 101. For example, the PSC 603 may transmit the isolation message to the first Power Controller 605.

Thus, in some embodiments, the step 403 of the method of FIG. 4 may comprise the PSC 603 transmitting an isolation message to the first network node 101, in particular a Power Controller 605 of the first network node 101.

The first Power Controller 605 may receive the isolation message from the PSC 603. In response to receiving the isolation message from the PSC 603, the first Power Controller 605 may switch the power supply of the first network node 101 from the electrical power grid to the alternative power supply. This switching of the power supply to the alternative power supply may be referred to as placing the first network node 101 in isolation mode.

By placing the first network node 101 in isolation mode and disconnecting the first network node 101 from the electrical power grid, the first network node may be able to avoid the fluctuations in signal strength in the data transmission link 103 resulting from the electrical power grid being unstable. Thus, the first network node may be able to avoid the degradation of the transmission rate in the data transmission link 103 which would otherwise be caused by said fluctuations.

By placing the first network node 101 in isolation mode prior to the electrical power grid becoming unstable (i.e. the placing the first network node into isolation mode based on a predicted decrease in the transmission rate of data rather than an actual decrease in the transmission rate), it may be possible to proactively avoid the degradation of the transmission rate in the data transmission link 103. In some embodiments, this may improve the performance of the data transmission link 103 coupling the first network node 101 and the second network node 102.

Furthermore, by switching the power supply of the first network node 101 from the electrical power grid to the alternative power supply, wherein the alternative power supply comprises a battery, there may be no need for the battery to perform a discharging cycle, which may otherwise be required to maintain battery health.

In some embodiments, the alternative power supply may comprise a battery. However, it will be appreciated that the alternative power supply may comprise any suitable alternative power source that is configured to supply power to the first network node 101. For example, the alternative power supply may comprise a diesel generator, a fuel cell or a solar panel.

In some embodiments, wherein the alternative power supply comprises a battery, the power supply of the first network node 101 may be switched from the electrical power grid to the alternative power supply by reducing the Power Supply Unit, PSU, output voltage in the first network node 101. This reduction in the PSU output voltage will trigger the battery to supply power to the first network node 101. In some embodiments the PSU output voltage may be dropped to zero in order to cause the first network node to switch to using the alternative power supply.

In some embodiments, the first Battery Monitor 604 may be configured to monitor the charge level of the alternative power supply of the first network node 101. The monitoring of the charge level may be periodic, intermittent, or continuous. For example, the first Battery Monitor 604 may be configured to monitor the charge level of the alternative power supply by monitoring the voltage level of the alternative power supply of the first network node 101.

In some embodiments, the first Power Controller 605 may be configured to switch the power supply of the first network node 101.

In some embodiments, any network node comprised within the communications network 600 may be configured to monitor the charge level of the alternative power supply of any other network node comprised within the communications network 600. For example, the second network node 102 may be configured to transmit an indication of the charge level of the alternative power supply to the first network node 101.

In some embodiments, the first Battery Monitor 604 may transmit an indication of a charge level of the alternative power supply to a power controlling network node. The power controlling network node may comprise the second network node 102, NOC 104, or any other suitable network node comprised within a suitable communications network (such as communications network 100, or communications network 600, for example).

Thus, in some embodiments, the step 501 of the method of FIG. 5 may comprise the first Battery Monitor 604 transmitting an indication of a charge level of the alternative power supply to the PSC 603.

In some embodiments, the PSC 603 may receive an indication that a charge level of the alternative power supply exceeds a first threshold level. Said indication may be received from the first Battery Monitor 604. Responsive to determining that the charge level of the alternative power supply exceeds the first threshold level, the PSC 603 may then transmit the first request to switch the power supply of the first network node 101 from the electrical power grid to the alternative power supply. The first request may comprise an isolation message, as described above. The PSC 603 may transmit the request to the first Power Controller 605.

Thus, in some embodiments, the step 503 of the method of FIG. 5 may comprise the first Power Controller 605 receiving, from the PSC 603, an isolation message.

In some embodiments, the first Battery Monitor 604 may determine that a charge level of the alternative power supply exceeds a first threshold level. In some embodiments, responsive to receiving the request from the PSC 603 to switch the power supply of the first network node 101, and responsive to determining that the charge level of the alternative power supply exceeds the first threshold level, the first Power Controller 605 may switch the power supply of the first network node 101 from the electrical power grid to the alternative power supply. For example, the first Battery Monitor 604 may only switch from the electrical power grid to the alternative power supply if the charge level of the alternative power supply exceeds, for example, 20% of the maximum charge level of the alternative power supply. This may prevent the first network node 101 from switching to using the alternative power supply if the alternative power supply is at risk of running out of charge. In other words, it may be considered more acceptable for the first network node 101 to experience a degradation in the transmission rate to the second network node, than for the first network node 101 to potentially run out of power.

In some examples, the first threshold level may be dependent on the first confidence value associated with the transmission rate, or dependent on the length of time that the drop in transmission rate is predicted to occur for. In other words, if the transmission rate is highly likely to drop, the first threshold level that the charge level of the alternative power supply is compared to may be lower. Alternatively, if the length of time that the drop in transmission rate is predicted to occur for is short, then the first threshold level may be lower.

In some embodiments, in response to the first Power Controller 605 receiving the request from the PSC 603 to switch the power supply of the first network node 101, the first Battery Monitor 604 may determine a charge level of the alternative power supply. In some embodiments, responsive to the charge level of the alternative power supply failing to meet a predetermined criterion, the first Power Controller 605 may maintain the power supply of the first network node from the electrical power grid. In one example, the predetermined criterion may be that the charge level of the alternative power supply exceeds the first threshold level. In another example, wherein the alternative power supply comprises a battery, the predetermined criterion may be that the age of battery is below a threshold age. In another example, the predetermined criterion may be a number of charge cycles of the battery. For example, as the battery charge capacity may degrade with each charge cycle executed a high number of charge cycles may indicate that the battery is less reliable.

In some embodiments, responsive to switching the power supply of the first network node 101 from the electrical power grid to the alternative power supply, the PSC 603 may monitor a charge level of the alternative power supply. The PSC 603 may receive an indication of the charge level of the alternative power supply from the first Battery Monitor 604. In some embodiments, responsive to the charge level of the alternative power supply dropping below a second threshold level, PSC 603 transmit a third request to switch the power supply of the first network node from the alternative power supply to the electrical power grid. This process may prevent the first network node 101 for running out of power supply during transmission. In other words, it may be considered preferable for the first network node 101 to experience a drop in transmission rate, than for the first network node 101 to run out of power The third request may be transmitted to the first Power Controller 605. For example, in some embodiments, the first Battery Monitor 604 may determine that the charge level of the alternative power supply has dropped below 10% of the maximum charge level of the alternative power supply. Thus, the first network node 101 may be released from isolation mode.

In some embodiments, the PSC 603 may receive an indication of a first predicted period (as described above) during which the predicted decrease in the transmission rate of data transmitted by the first network node over the data transmission link is predicted to occur. In some embodiments, responsive to transmitting the first request and responsive to the first predicted period elapsing, the PSC 603 may transmit a second request to switch the power supply of the first network node 101 from the alternative power supply to the electrical power grid. The PSC 603 may transmit the second request to the first Power Controller 605. Thus, the first network node 101 may be released from isolation mode.

In some embodiments, the Data Collector 601 may receive second information indicative of a predicted increase in a transmission rate of data transmitted by the first network node 101 over the data transmission link 103. The Data Collector 601 may receive the second information in the same manner in which the Data Collector 601 receives the first information, as described above. The Data Collector 601 may transmit the received second information to the Prediction Model 602.

In some embodiments, the Prediction Model 602 may be configured to determine that received second information is indicative of a predicted increase in a transmission rate of data transmitted by the first network node 101 over the data transmission link 103.

In some embodiments, the Prediction Model 602 may predict future signal strength fluctuations based on the received second information. For example, responsive to the prediction of the future signal strength fluctuations meeting a second predetermined criterion, the Prediction Model 602 may determine that the received second information is indicative of a predicted increase in a transmission rate of the data transmitted by the first network node 101 over the data transmission link 103. For example, the second predetermined criterion may be that the signal strength across the data transmission link 103 exceeds the threshold level below which the transmission rate through the data transmission link 103 will drop below the maximum transmission rate.

Thus, in some embodiments, the Prediction Model 602 may use the received second information to predict whether the signal strength in the data transmission link 103 may be unstable or stable for a second future time period which is after the first future time period. For example, the Prediction Model 602 may determine that the signal strength in the data transmission link 103 may be unstable for the second future time period of time if the received second information is indicative of a predicted decrease in a transmission rate of data transmitted by the first network node 101 over the data transmission link 103. In this case the Prediction Model 602 may generate an unstable signal message indicating that the first network node should remain using the alternative power supply. Alternatively, the Prediction Model 602 may not generate any message, leaving the first network node using the alternative power supply.

In some cases, the Prediction Model 602 may determine that the signal strength in the data transmission link 103 may be stable for the second future time period if the received second information is not indicative of a predicted decrease in a transmission rate of data transmitted by the first network node 101 over the data transmission link 103, or if the received second information is indicative of a predicted increase in a transmission rate of data transmitted by the first network node 101 over the data transmission link 103. In response to determining that the signal strength in the data transmission link may be stable for the second future time period, the Prediction Model may generate a stable signal message, and may transmit the stable signal message to the PSC 603.

In response to receiving the stable signal message, the PSC 603 may generate a release message. The release message may comprise a second request to the first network node 101 to switch the power supply of the first network node 101 from the alternative power supply to the electrical power grid. The PSC 603 may transmit the release message to the first network node 101. For example, the PSC 603 may transmit the release message to the first Power Controller 605.

Thus, in some embodiments, responsive to switching the power supply of the first network node 101 from the electrical power grid to the alternative power supply, and responsive to receiving second information indicative of a predicted increase in a transmission rate of data transmitted by the first network node 101 over the data transmission link 103, the PSC 603 may transmit a second request to the first network node 101 to switch the power supply of the first network node 101 from the alternative power supply to the electrical power grid. Therefore, the second network node or NOC monitors the signal strength fluctuations of the signals received at the second network node, and switches the first network node from using the alternative power supply and using the electrical grid appropriately.

In some embodiments, the Prediction Model 602 may be configured to generate an indication of a second predicted period during which the signal strength is predicted to be stable. In some embodiments, the indication of the second predicted period may be generated based on the received second information. Additionally or alternatively, the second predicted period may be generated based on historical data. The indication of the second predicted period may correspond to the period during which a predicted increase in the transmission rate of data transmitted by the first network node 101 over the data transmission link 103 is predicted to occur. The Prediction Model 602 may transmit the indication of the second predicted period to the PSC 603. The predicted increase in the transmission rate of data transmitted by the first network node 101 over the data transmission link 103 may or may not be associated with the second predicted period.

Thus, in some embodiments, the PSC may receive an indication of a second predicted period during which the predicted increase in the transmission rate of data transmitted by the first network node 101 over the data transmission link 103 is predicted to occur.

In some embodiments, the Prediction Model 602 may be configured to generate a second confidence value related to the predicted increase in the transmission rate of data transmitted by the first network node 101 over the data transmission link 103. For example, the second confidence value may indicate a confidence in the predicted increase in the transmission rate of data transmitted by the first network node 101 over the data transmission link 103 during said associated second predicted period. For example the second confidence value may comprise a percentage likelihood that the transmission rate will remain at the maximum transmission rate during the second predicted period.

In some embodiments, in which the predicted increase in the transmission rate is not associated with a second predicted period, the second confidence value may indicate a confidence in the predicted increase in the data transmission rate of data transmitted by the first network node 101 over the data transmission link 103 until the first network node is otherwise notified that the transmission rate is unstable by the Prediction Model 602.

In some embodiments, the Prediction Model 602 may transmit the second confidence value to the PSC 603.

Thus, in some embodiments, the PSC 603 may receive a confidence value. The confidence value may be the first confidence value, or the second confidence value, as described above. The confidence value may be associated with a request to switch the power supply of the first network node 101.

Thus, in some embodiments, the PSC 603 may determine if a confidence value associated with said request meets a predetermined criterion. In some embodiments, responsive to the confidence value associated with the request failing to meet a predetermined criterion, the PSC 603 may not transmit the request to the first Power Controller 605 to switch the power supply of the first network node 101. Thus, the first Power Controller 605 may maintain the power supply of the first network node 101 as the electrical power grid, or maintain the power supply of the first network node as the alternative power supply. For example, in some embodiments, the power supply of the first network node 101 of the first network node 101 may only be switched if the confidence value associated with the request (and therefore, the confidence in the predicted increase or decrease in a transmission rate of data occurring in some future period or until the first network node 101 is otherwise notified) exceeds some threshold level.

In some embodiments, the first Power Controller 605 may receive a request from the PSC 603 to switch the power supply of the first network node 101. In some examples, the first Power Controller 605 may treat this request as a recommendation. For example, it may be known that the first network node 101 may be unable to sustain itself while being powered by an alternative power supply. In one example of this, the alternative power supply may have very old batteries, or not have enough fuel in its diesel generators. Thus, in some embodiments, the first Power Controller 605 may choose to reject the received request to switch the power supply of the first network node 101, based on some knowledge of the alternative power supply itself.

In some embodiments, responsive to the first Power Controller 605 switching the power supply of the first network node 101 from the alternative power supply to the electrical power grid, the alternative power supply may be recharged.

In some embodiments, the PSC 603 may be configured to communicate with a second Battery Monitor 606 and a second Power Controller 607.

In some embodiments, the second Battery Monitor 606 may be configured to monitor the charge level of the alternative power supply of the second network node 102. The monitoring of the charge level may be periodic, intermittent, or continuous. Additionally or alternatively, the second Battery Monitor 606 may be configured to monitor charge level of the alternative power supply of the second network node by monitoring the voltage level of the alternative power supply of the second network node 102. The monitoring of the voltage level may be periodic, intermittent, or continuous.

In some embodiments, the second Power Controller 607 may be configured to switch the power supply of the second network node 102.

The second Battery Monitor 606 and the second Power Controller 607 may be comprised within the second network node 102. In some embodiments, the PSC 603 may communicate with the second Battery Monitor 606 and the second Power Controller in substantially the same manner that the PSC 603 may communicate with the first Battery Monitor 604 and the first Power Controller 605, as described above. Thus, the PSC 603 may place the second network node 102 in isolation mode, and may release the second network node 102 from isolation mode, in substantially the same manner that the PSC 603 may place the first network node 101 in isolation mode, and may release the first network node 101 from isolation mode, as described above.

Figure 7:
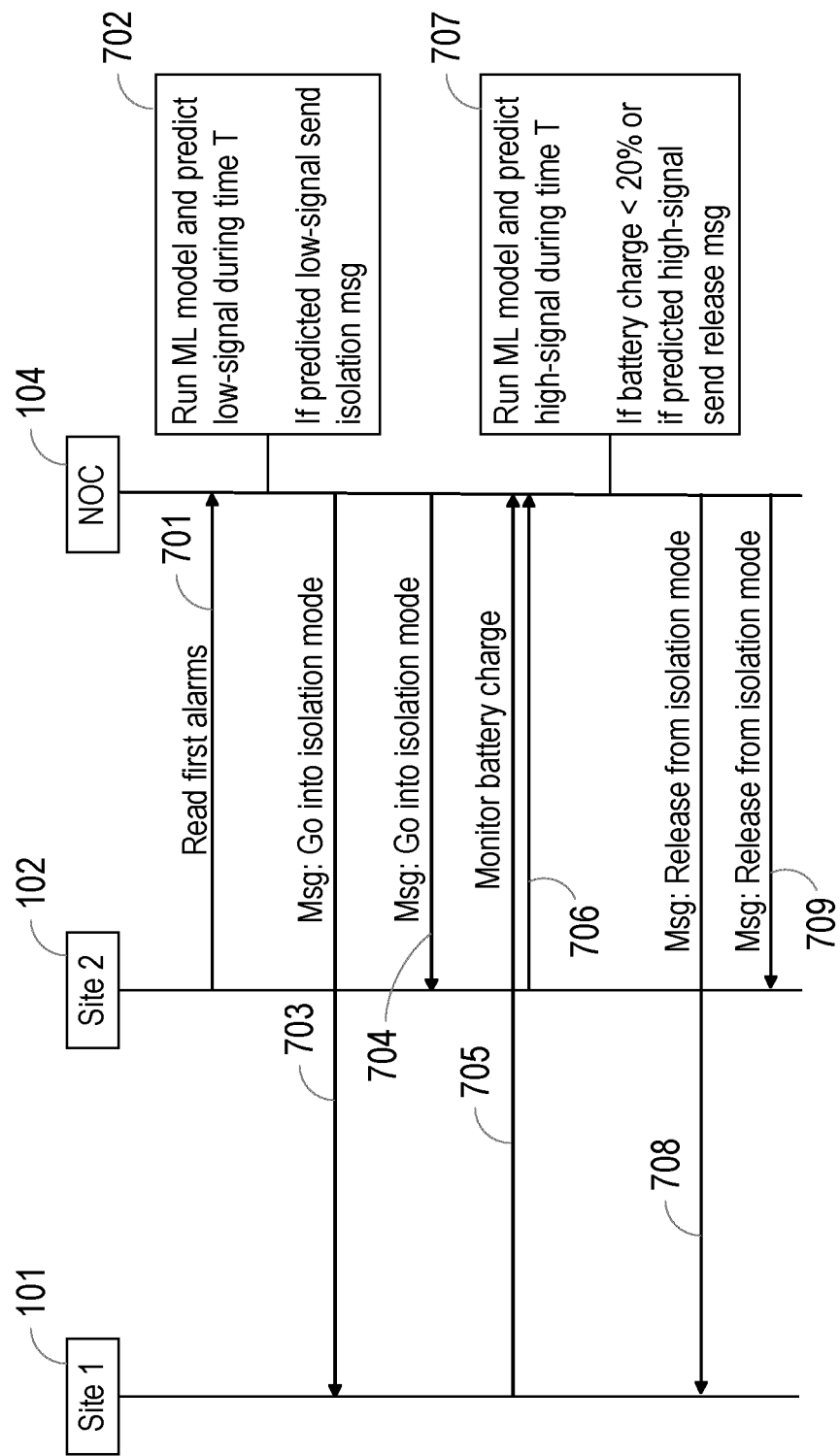
FIG. 7 illustrates an example of a sequence diagram for controlling switching a power supply of a network node between an electrical power grid and an alternative power supply.

FIG. 7 illustrates an example of a sequence diagram for controlling switching a power supply of a network node between an electrical power grid and an alternative power supply, wherein the Power Stabilizing Controller (for example, PSC 603) is comprised within a Network Operation Centre, NOC, node (for example, NOC 104), according to embodiments of the disclosure.

In step 701, the second network node 102 may transmit received first information indicative of a predicted decrease in the transmission rate of data transmitted by the first network node 101 over the data transmission link 103, to the NOC 104. The received first information may comprise a first number of alarms generated at the second network node 102, for example.

In step 702, the NOC 104 may input the received first information into a prediction model, for example, Prediction Model 602. The prediction model may determine that the received first information is indicative of a predicted decrease in a transmission rate of data transmitted by the first network node 101 over the data transmission link 103, as described above with reference to FIG. 6.

In response to determining that the received first information is indicative of a predicted decrease in the transmission rate of data transmitted by the first network node 101 over the data transmission link 103; at step 703, the NOC 104 may transmit an isolation message to the first network node 101.

An isolation message may comprise a first request to switch the power supply of the first network node 101 from the electrical power grid to the alternative power supply.

Thus, at step 703, the first network node 101 may be placed in isolation mode.

In some embodiments, the second network node 102 may also be placed in isolation mode in step 704. For example, the NOC 104 may transmit an isolation message to the second network node 102. For example, in some examples, data transmission may occur in both directions between the first network node 101 and the second network node 102, and therefore the NOC may determine that the transmission in both directions may benefit from being powered by an alternative power source.

Alternatively, the first network node 101 and the second network node 102 may be located proximal to one another, and therefore, in examples where the weather or other environmental conditions are affecting the rate of data transmitted by the first network node 101, the NOC may assume that the same conditions are affecting the second network node 102. The NOC 104 may therefore, in some examples, transmit requests to both the first network node and the second network node to switch the power supply of the respective nodes to their respective alternative power supplies.

At step 705, the NOC 104 may monitor a charge level of the alternative power supply of the first network node 101. For example, the first network node 101 may transmit an indication of the charge level of the alternative power supply of the first network node 101 to the NOC 104.

In some embodiments, in which the second network node may also have been placed in isolation mode, at step 706, the NOC 104 may also monitor a charge level of the alternative power supply of the second network node 102. For example, the second network node 102 may transmit an indication of the charge level of the alternative power supply of the second network node 102 to the NOC 104.

In some embodiments, at step 707, the NOC 104 may receive second information from the second network node 102. Alternatively or additionally, at step 707, the NOC 104 may receive second information from an external source. For example, the external source may comprise a weather sensor located at the first network node 101 or the second network node 102, or an external weather forecasting service.

The prediction model may determine whether the received second information is indicative of a predicted increase in a transmission rate of data transmitted by the first network node 101 over the data transmission link 103, as described above with reference to FIG. 6.

In response to determining that the received second information is indicative of a predicted increase in a transmission rate of data transmitted by the first network node 101 over the data transmission link 103; at step 708, the NOC 104 may transmit a release message to the first network node 101. Alternatively, the NOC 104 may transmit the release message to the first network node 101 in response to the charge level of the alternative power supply of the first network node 101 dropping below a second threshold level The release message may comprise to a request to switch the power supply of the first network node 101 from the alternative power supply to the electrical power grid.

Thus, at step 708, the first network node 101 may be released from isolation mode.

In some embodiments, in which the second network node 102 has been placed in isolation mode in response to determining that the received second information is indicative of a predicted increase in a transmission rate of data transmitted by the first network node 101 over the data transmission link 103; at step 709, the NOC 104 may transmit a release message to the second network node 102. Alternatively, the NOC 104 may transmit the release message to the second network node 102 in response to the charge level of the alternative power supply of the second network node 102 dropping below a second threshold level The release message may comprise a request to switch the power supply of the second network node 102 from the alternative power supply to the electrical power grid.

Thus, at step 709, the second network node 102 may also be released from isolation mode.

Figure 8:
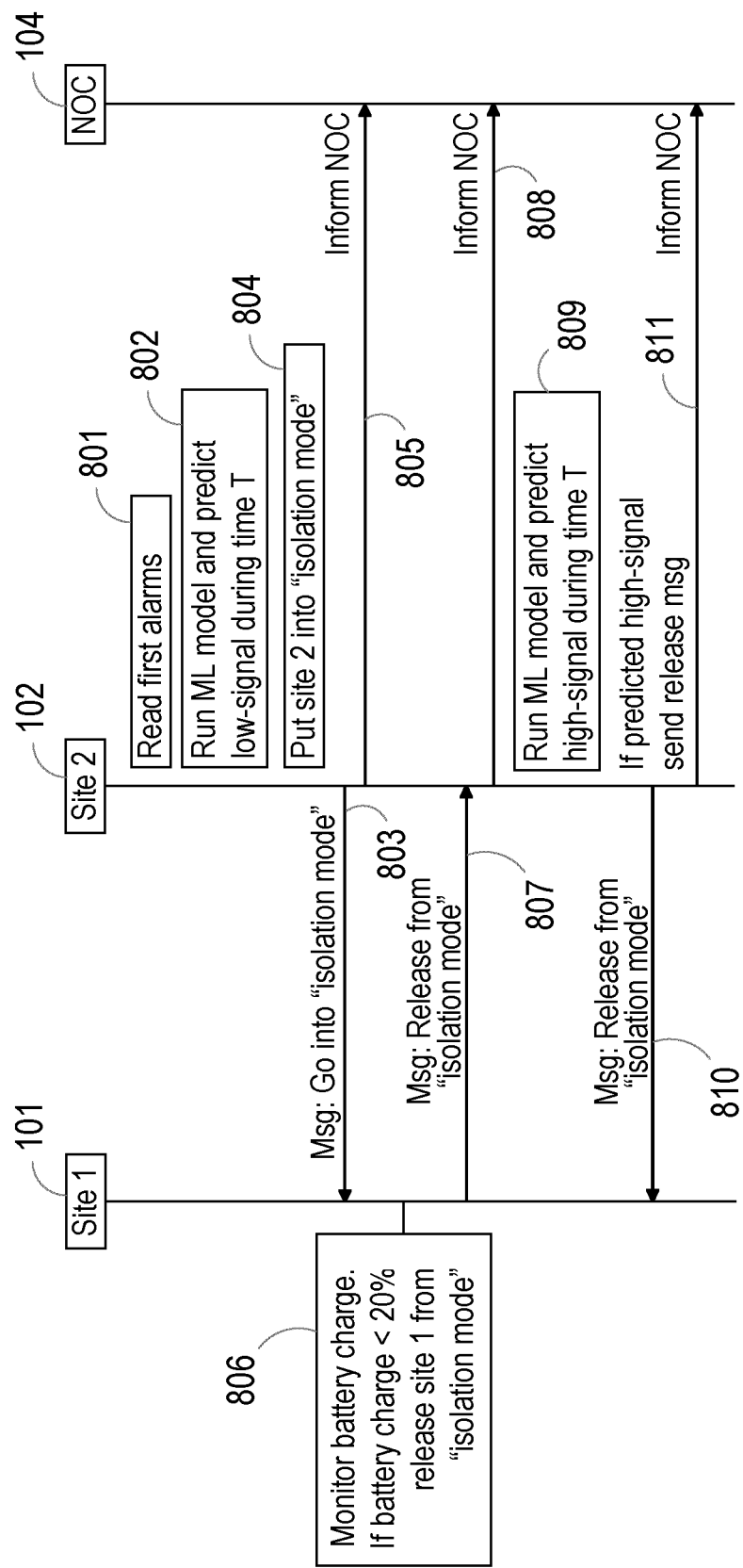
FIG. 8 illustrates an example of a sequence diagram for controlling switching a power supply of a network node between an electrical power grid and an alternative power supply.

FIG. 8 illustrates an example of a sequence diagram for controlling switching a power supply of a network node between an electrical power grid and an alternative power supply, wherein the Power Stabilizing Controller (for example, PSC 603) is comprised within a network node (for example, second network node 102), according to embodiments of the disclosure.

In step 801, the second network node 102 may receive first information indicative of a predicted decrease in a transmission rate of data transmitted by the first network node 101 over the data transmission link 103. The first information may be generated or received as described above.

In step 802, the second network node 102 may input the received first information into a prediction model (for example, Prediction Model 602). The prediction model may determine that the received first information is indicative of a predicted decrease in a transmission rate of data transmitted by the first network node 101 over the data transmission link 103 as described above with reference to FIG. 6.

In response to determining that the received first information is indicative of a predicted decrease in a transmission rate of data transmitted by the first network node 101 over the data transmission link 103; at step 803, the second network node 102 may transmit an isolation message to the first network node 101.

The isolation message may comprise a first request to switch the power supply of the first network node 101 from the electrical power grid to the alternative power supply.

Thus, at step 803, the first network node 101 may be placed in isolation mode.

In some embodiments, the second network node 102 may also place itself in isolation mode at step 804. For example, in some examples, the data transmission may occur in both directions between the first network node 101 and the second network node 102, and therefore the second network node 102 may determine that the transmission in both directions may benefit from being powered by an alternative power source. In other embodiments, the first network node 101 and the second network node 102 may be located proximal to one another, and therefore, in examples where the weather or other environmental conditions are affecting the rate of data transmitted by the first network node 101, the second network node 102 may assume that the same conditions are affecting the second network node 102. The second network node 102 may therefore transmit a first request to the first network node 101 to switch the power supply of the first network node to respective alternative power supplies whilst also switching its own power supply to a respective alternative power supply.

In some embodiments, at step 805, the second network node 102 may inform the NOC 104 that the first network node 101, and optionally, the second network node 102, have been placed in isolation mode.

In some embodiments the steps 806 to 808 may be performed in which the first network node 101 releases itself from isolation mode.

At step 806, the first network node 101 may monitor a charge level of the alternative power supply of the first network node 101. The first network node 101 may receive an indication that the charge level of the alternative power supply of the first network node 101 has dropped below a second threshold level. Responsive to this, at step 806, the first network node 101 may switch the power supply of the first network node 101 from the alternative power supply to the electrical power grid.

Thus, at step 806, the first network node 101 may be released from isolation mode.

At step 807, the first network node 101 may inform the second network node 102 that it has released itself from isolation mode.

In some embodiments, at step 808, the second network node 102 may inform the NOC 104 that the first network node has been released from isolation mode.

It will also be appreciated that the second network node 102 may also have been placed in isolation mode, and may be monitoring a charge level of the alternative power supply of the second network node 102. The second network node 102 may receive an indication that the charge level of the alternative power supply of the second network node 102 has dropped below a second threshold level. Responsive to this, the second network node 102 may switch the power supply of the second network node 102 from the alternative power supply to the electrical power grid.

Thus, the second network node 102 may release itself from isolation mode.

Thus, in some embodiments, at step 808, the second network node 102 may additionally or alternatively inform the NOC 104 that the second network node 102 has been "released" from isolation mode.

In some embodiments steps 809 to 811 may be performed in which the second network node 102 releases the first network node 101 from isolation mode.

In some embodiments, at step 809, the second network node 102 may receive second information. The received second information may be generated at the second network node 102. Alternatively or additionally, at step 809, the second network node 102 may receive second information from an external source. As previously described with reference to FIG. 6, the prediction model may determine that the received second information is indicative of a predicted increase in a transmission rate of data transmitted by the first network node 101 over the data transmission link 103.

In response to determining that the received second information is indicative of a predicted increase in a transmission rate of data transmitted by the first network node 101 over the data transmission link 103; at step 810, the second network node 102 may transmit a release message to the first network node 101.

The release message may comprise a request to switch the power supply of the first network node 101 from the alternative power supply to the electrical power grid.

Thus, at step 810, the first network node 101 may be released from isolation mode.

In some embodiments, at step 811, the second network node 102 may inform the NOC 104 that the first network node has been released from isolation mode.

In some embodiments, in which the second network node 102 has been placed in isolation mode, in response to determining that the received second information is indicative of a predicted increase in a transmission rate of data transmitted by the first network node 101 over the data transmission link 103; the second network node 102 may release itself from isolation mode.

In some embodiments, therefore step 811 may also comprise the second network node 102 informing the NOC 104 that the second network node 102 has been released from isolation mode.

Figure 9:
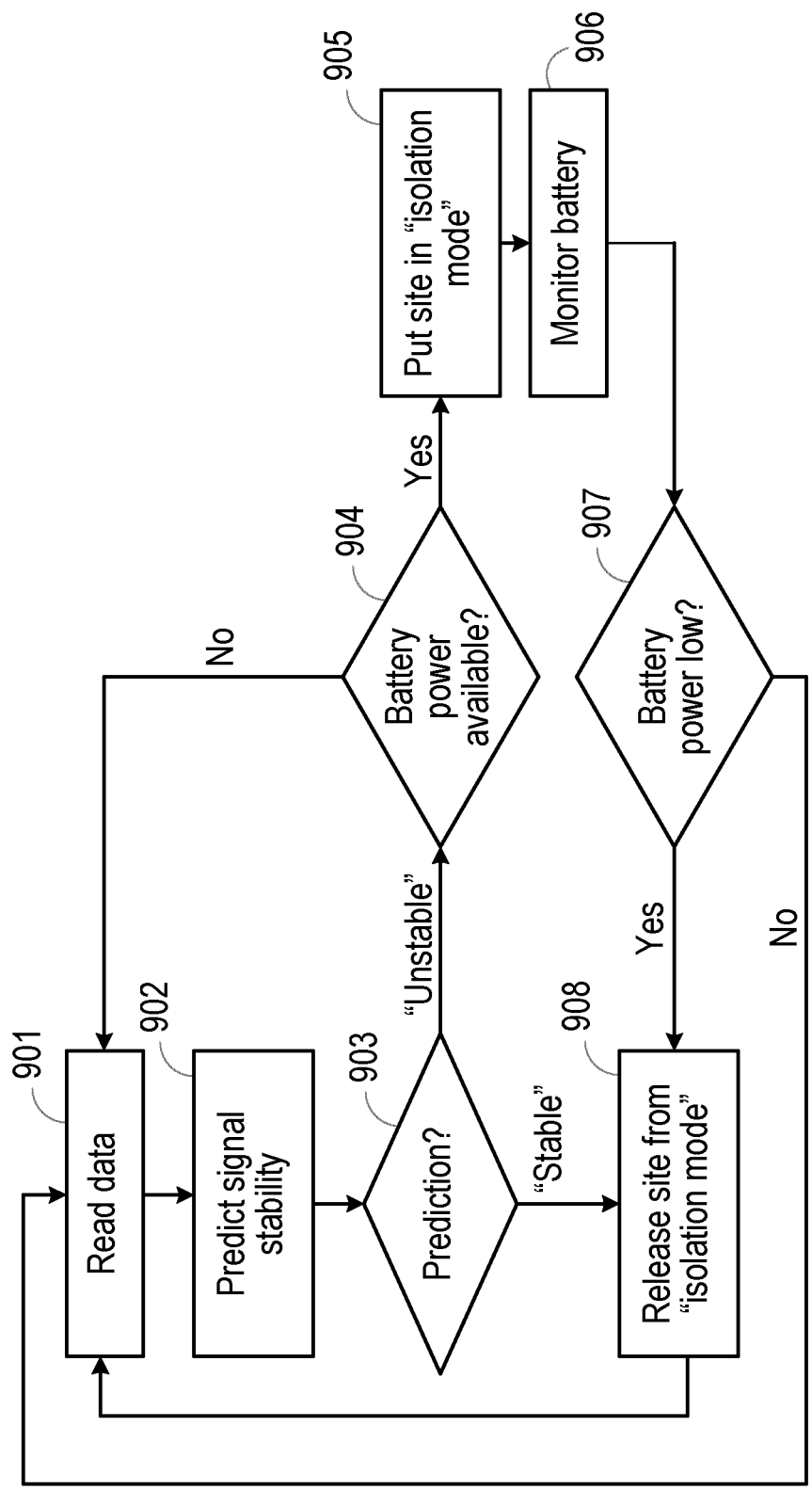
FIG. 9 illustrates a flowchart of a method according to embodiments of the disclosure.

FIG. 9 illustrates a flowchart of a method according to embodiments of the disclosure. The method may be performed in any suitable communications network (communications network 100, or communications network 600, for example) or may be performed in any suitable network node (second network node 102, or NOC 104, for example).

Although it will be appreciated that the method of FIG. 9 may be performed by the second network node 102, the NOC 104, any suitable network node comprised within a suitable communications network (communications network 100, or communications network 600, for example), or any plurality of suitable network nodes comprised within a suitable communications network (communications network 100, or communications network 600, for example), the method of FIG. 9 will be described below with reference as to being performed by a NOC 104.

At step 901, the NOC 104 may receive first information from the second network node 102. Alternatively or additionally, at step 901, the NOC 104 may receive the first information from an external source.

At step 902, the NOC 104 may predict future signal strength fluctuations based on the received first information. Responsive to the prediction of the future signal strength fluctuations meeting a predetermined criterion, the NOC 104 may determine that the received first information is indicative of a predicted decrease in a transmission rate of the data transmitted by the first network node 101 over the data transmission link 103.

At step 903, the NOC 104 may use this determination to predict whether the signal strength may be stable or unstable for a first future time period.

In response to determining that the signal strength in the data transmission link 103 may be unstable for the first future time period at step 903, at step 904, the NOC 104 may determine whether the charge level of the alternative power supply (wherein the alternative power supply is configured to supply power to the first network node 101) exceeds a first threshold level.

In response to determining that the charge level of the alternative power supply exceeds the first threshold level at step 904, at step 905, the NOC 104 may transmit a first request to switch the power supply of the first network node 101 from the electrical power grid to the alternative power supply. Thus, the first network node 101 may be placed in isolation mode.

In response to determining that the charge level of the alternative power supply does not exceed the first threshold level at step 904, the method returns to step 901.

At step 906 (following the isolation of the first network node 101 at step 905) the NOC 104 may monitor a charge level of the alternative power supply.

At step 907, the NOC 104 determines if it has received an indication that a charge level of the alternative power supply has dropped below a second threshold level.

In response to receiving an indication that a charge level of the alternative power supply has dropped below a second threshold level at step 907, at step 908, the NOC 104 may transmit a third request to switch the power supply of the first network node 101 from the alternative power supply to the electrical power grid. Thus, the first network node 101 may be released from isolation mode. The method then returns to step 901.

Alternatively, if at step 907, the NOC 104 determines that the charge level of the alternative power supply exceeds the second threshold level, the process may return to step 901. Thus, the power supply of the first network node is maintained from the alternative power supply.

Alternatively, in response to determining that the signal strength in the data transmission link 103 may be unstable for some future period at step 903, the method will advance to step 908, and the NOC 104 may transmit a third request to switch the power supply of the first network node 101 from the alternative power supply to the electrical power grid. Thus, the first network node 101 may be released from isolation mode. The method will then return to step 901. If the first network node 101 is not in isolation mode, the method will return to step 901.

Alternatively, if at step 907 the NOC 104 determines if it has received an indication that a charge level of the alternative power supply has exceeds below a second threshold level, the method returns to step 901.

In other words, the NOC 104 monitors both the signal strength fluctuations of the signals received at the second network node as well as the charge level of the alternative power supply of the first network node and/or second network node. Based on this monitoring, the NOC 104 determines whether the first network node and/or second network node should use the alternative power supply or the electrical grid.

It will be appreciated that the methods as described above may be implemented in any suitable communications network or data transmission network. For example, such networks may comprise a fiber communications network, a laser communications network, a radio link communications network or a micro-wave link communications network.

Figure 10:
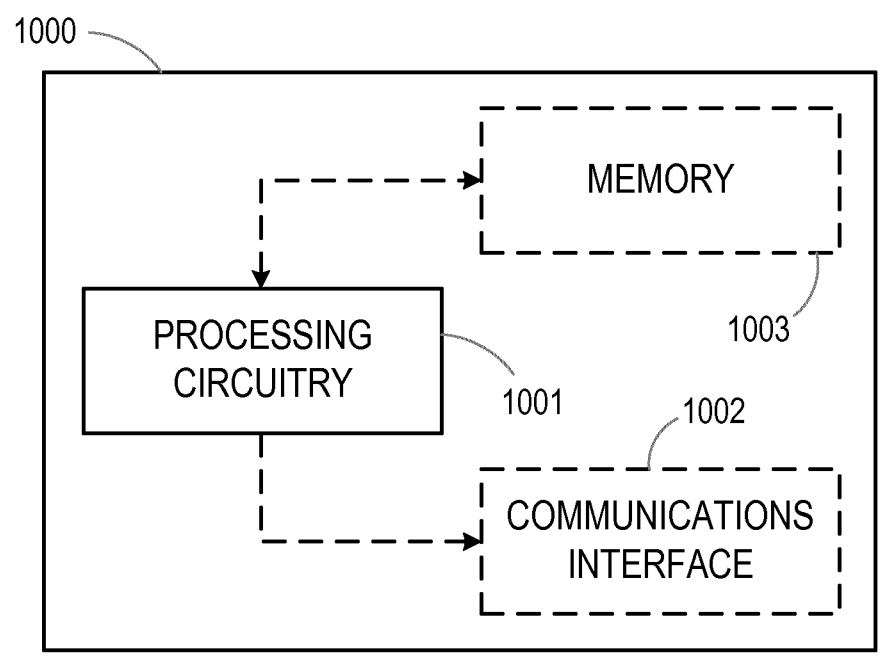
FIG. 10 illustrates a power controlling network node according to some embodiments comprising processing circuitry (or logic)

FIG. 10 illustrates a power controlling network node 1000 according to some embodiments comprising processing circuitry (or logic) 1001. The processing circuitry 1001 controls the operation of the power controlling network node 1000 and can implement the method described herein in relation to a power controlling network node 1000, for example the second network node 102 or the NOC 104. The processing circuitry 1001 can comprise one or more processors, processing units, multi-core processors or modules that are configured or programmed to control the power controlling network node 1000 in the manner described herein. In particular implementations, the processing circuitry 1001 can comprise a plurality of software and/or hardware modules that are each configured to perform, or are for performing, individual or multiple steps of the method described herein in relation to the power controlling network node 1000.

Briefly, the processing circuitry 1001 of the power controlling network node 1000 is configured to: receive first information indicative of a predicted decrease in a transmission rate of data transmitted by the first network node over the data transmission link; and responsive to receiving the first information, transmit a first request to the first network node to switch the power supply of the first network node from the electrical power grid to the alternative power supply.

In some embodiments, the power controlling network node 1000 may optionally comprise a communications interface 1002. The communications interface 1002 of the power controlling network node 1000 can be for use in communicating with other nodes, such as other virtual nodes. For example, the communications interface 1002 of the power controlling network node 1000 can be configured to transmit to and/or receive from other nodes requests, resources, information, data, signals, or similar. The processing circuitry 1001 of the power controlling network node 1000 may be configured to control the communications interface 1002 of the power controlling network node 1000 to transmit to and/or receive from other nodes requests, resources, information, data, signals, or similar.

Optionally, the power controlling network node 1000 may comprise a memory 1003. In some embodiments, the memory 1003 of the power controlling network node 1000 can be configured to store program code that can be executed by the processing circuitry 1001 of the power controlling network node 1000 to perform the method described herein in relation to the power controlling network node 1000. Alternatively or in addition, the memory 1003 of the power controlling network node 1000, can be configured to store any requests, resources, information, data, signals, or similar that are described herein. The processing circuitry 1001 of the power controlling network node 1000 may be configured to control the memory 1003 of the power controlling network node 1000 to store any requests, resources, information, data, signals, or similar that are described herein.

Figure 11:
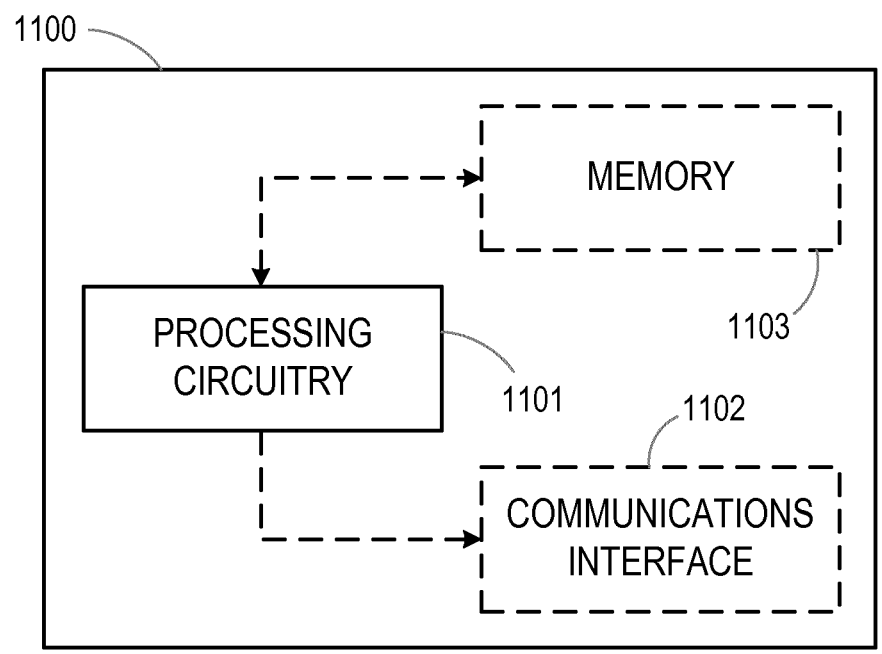
FIG. 11 illustrates a first network node according to some embodiments comprising processing circuitry (or logic).

FIG. 11 illustrates a first network node 1100 according to some embodiments comprising processing circuitry (or logic) 1101. The processing circuitry 1101 controls the operation of the first network node 1100 and can implement the method described herein in relation to a first network node 1100, for example the first network node 101. The processing circuitry 1101 can comprise one or more processors, processing units, multi-core processors or modules that are configured or programmed to control the first network node 1100 in the manner described herein. In particular implementations, the processing circuitry 1101 can comprise a plurality of software and/or hardware modules that are each configured to perform, or are for performing, individual or multiple steps of the method described herein in relation to the first network node 1100.

Briefly, the processing circuitry 1101 of the first network node 1100 is configured to: transmit an indication of a charge level of the alternative power supply to a power controlling network node; and receive, from the power controlling network node, a request to switch the power supply of the first network node from the electrical power grid to the alternative power supply.

In some embodiments, the first network node 1100 may optionally comprise a communications interface 1102. The communications interface 1102 of the first network node 1100 can be for use in communicating with other nodes, such as other virtual nodes. For example, the communications interface 1102 of the first network node 1100 can be configured to transmit to and/or receive from other nodes requests, resources, information, data, signals, or similar. The processing circuitry 1101 of the first network node 1100 may be configured to control the communications interface 1102 of the first network node 1100 to transmit to and/or receive from other nodes requests, resources, information, data, signals, or similar.

Optionally, the first network node 1100 may comprise a memory 1103. In some embodiments, the memory 1103 of the first network node 1100 can be configured to store program code that can be executed by the processing circuitry 1101 of the first network node 1100 to perform the method described herein in relation to the first network node 1100. Alternatively or in addition, the memory 1103 of the first network node 1100, can be configured to store any requests, resources, information, data, signals, or similar that are described herein. The processing circuitry 1101 of the first network node 1100 may be configured to control the memory 1103 of the first network node 1100 to store any requests, resources, information, data, signals, or similar that are described herein.

There is therefore provided a methods and apparatus for controlling the switching of the power supply of a network node between the electrical grid and an alternative power supply.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method for controlling switching a power supply of a first network node between an electrical power grid and an alternative power supply, the method comprising:
   receiving first information indicative of a predicted decrease in a transmission rate of data transmitted by the first network node over a data transmission link, the first network node being configured to transmit data to a second network node over the data transmission link; and
   responsive to receiving the first information, transmitting a first request to the first network node to switch the power supply of the first network node from the electrical power grid to the alternative power supply.

2. A method in a first network node for controlling switching a power supply of the first network node between an electrical power grid and an alternative power supply, the method comprising:
   transmitting an indication of a charge level of the alternative power supply to a power controlling network node; and
   receiving, from the power controlling network node, a request to switch the power supply of the first network node from the electrical power grid to the alternative power supply, the first network node being configured to transmit data to a second network node over a data transmission link.

3. A power controlling network node for controlling switching a power supply of a first network node between an electrical power grid and an alternative power supply, the power controlling network node comprising:
   an interface; and
   a processor, the processor being configured to:
      receive first information indicative of a predicted decrease in a transmission rate of data transmitted by the first network node over a data transmission link, the first network node being configured to transmit data to a second network node over the data transmission link; and
      responsive to receiving the first information, transmit a first request to the first network node to switch the power supply of the first network node from the electrical power grid to the alternative power supply.

4. The power controlling network node as claimed in claim 3, wherein the processor is further configured to:
   predict future signal strength fluctuations based on the received first information;
   responsive to the prediction of the future signal strength fluctuations meeting a predetermined criterion, determine that the received first information is indicative of a predicted decrease in a transmission rate of the data transmitted by the first network node over the data transmission link.

5. The power controlling network node as claimed in claim 4, wherein the received first information comprises an indication of the signal strength received at the second network node.

6. The power controlling network node as claimed in claim 3, wherein the processor is further configured to:
   transmit, to the first network node, a confidence value related to the predicted decrease in the transmission rate of data transmitted by the first network node over the data transmission link.

7. The power controlling network node as claimed claim 3, wherein the processor is further configured to:
   receive an indication of a first predicted period during which the predicted decrease in the transmission rate of data transmitted by the first network node over the data transmission link is predicted to occur.

8. The power controlling network node as claimed in claim 7, wherein the processor is further configured to:
   responsive to transmitting the first request and responsive to the first predicted period elapsing, transmit a second request to switch the power supply of the first network node from the alternative power supply to the electrical power grid.

9. The power controlling network node as claimed in claim 3, wherein the processor is further configured to:
   responsive to switching the power supply of the first network node from the electrical power grid to the alternative power supply; and
   responsive to receiving second information indicative of a predicted increase in a transmission rate of data transmitted by the first network node over the data transmission link, transmit a second request to the first network node to switch the power supply of the first network node from the alternative power supply to the electrical power grid.

10. The power controlling network node as claimed in claim 9, wherein the processor is further configured to:
   receive an indication of a second predicted period during which the predicted increase in the transmission rate of data transmitted by the first network node over the data transmission link is predicted to occur.

11. The power controlling network node as claimed in claim 3, wherein the processor is further configured to:

determine that the received first information is indicative of a predicted decrease in a transmission rate of data transmitted by the first network node over the data transmission link by comparing the received first information with a model.

12. The power controlling network node as claimed in claim 3, wherein the processor is further configured to:
receive an indication that a charge level of the alternative power supply exceeds a first threshold level; and
responsive to determining that the charge level of the alternative power supply exceeds the first threshold level, transmit the first request to switch the power supply of the first network node from the electrical power grid to the alternative power supply.

13. The power controlling network node as claimed in claim 3, wherein the processor is further configured to:
responsive to transmitting the first request to switch the power supply of the first network node from the electrical power grid to the alternative power supply, monitor a charge level of the alternative power supply; and
responsive to receiving an indication that a charge level of the alternative power supply has dropped below a second threshold level, transmit a third request to switch the power supply of the first network node from the alternative power supply to the electrical power grid.

14. The power controlling network node as claimed in claim 3, wherein the power controlling network node comprises one of the second network node and a Network Operation Centre, NOC, node.

15. A first network node for controlling switching a power supply of the first network node between an electrical power grid and an alternative power supply, the first network node comprising:
an interface; and
a processor, the processor being configured to:
cause transmission of an indication of a charge level of the alternative power supply to a power controlling network node; and
receive, from the power controlling network node, a request to switch the power supply of the first network node from the electrical power grid to the alternative power supply, the first network node being configured to transmit data to a second network node over a data transmission link.

16. The first network node as claimed in claim 15 wherein the processor is further configured to:
determine that a charge level of the alternative power supply exceeds a first threshold level; and
responsive receiving the request and determining that the charge level of the alternative power supply exceeds the threshold level, switch the power supply of the first network node from the electrical power grid to the alternative power supply.

17. The first network node as claimed in claim 16, wherein the processor is further configured to:
responsive to switching the power supply of the first network node from the electrical power grid to the alternative power supply, monitor a charge level of the alternative power supply; and
responsive to the charge level of the alternative power supply dropping below a second threshold level, switch the power supply of the first network node from the alternative power supply to the electrical power grid.

18. The first network node as claimed in claim 17, wherein the processor is further configured to:
responsive to receiving the request, determine a charge level of the alternative power supply; and
responsive to the charge level of the alternative power supply failing to meet a predetermined criterion, maintain the power supply of the first network node from the electrical power grid.

19. The first network node as claimed in claim 18, wherein the processor is further configured to:
responsive to receiving the request, determine if a confidence value associated with request meets a predetermined criterion; and
responsive to the confidence value associated with the request failing to meet a predetermined criterion, maintain the power supply of the first network node as the electrical power grid.

20. The first network node as claimed in claim 15 wherein at least one of:
the second network node comprises the power controlling network node; and
a network operation centre, NOC, node comprises the power controlling network node.

* * * * *